United States Patent [19]

Fix

[11] 4,354,397
[45] Oct. 19, 1982

[54] SUCKER ROD SHOCK ABSORBER

[76] Inventor: Paul W. Fix, P.O. Box 192, Florissant, Colo. 80816

[21] Appl. No.: 148,544

[22] Filed: May 9, 1980

[51] Int. Cl.³ .................... F16H 21/32; G05G 3/00
[52] U.S. Cl. ........................................ 74/108; 74/41; 74/582; 267/141
[58] Field of Search .............. 74/108, 41, 582; 267/140, 141, 153

[56] References Cited

U.S. PATENT DOCUMENTS

| | | | |
|---|---|---|---|
| 2,038,527 | 4/1936 | Eaton | 74/582 |
| 2,230,029 | 1/1941 | Eaton | 74/582 |
| 2,241,409 | 5/1941 | Mason | 74/582 |
| 2,925,266 | 2/1960 | McAllister | 267/70 |
| 3,144,247 | 8/1964 | Szonn et al. | 267/141 |
| 3,363,475 | 1/1968 | Foster et al. | 267/141 |
| 3,480,268 | 11/1969 | Fishbaugh | 267/141 |
| 3,606,295 | 9/1971 | Appleton | 267/140 |
| 3,831,923 | 8/1974 | Meldrum | 267/141 |
| 4,085,832 | 4/1978 | Gaines et al. | 267/140 |
| 4,176,714 | 12/1979 | Case | 267/153 |

FOREIGN PATENT DOCUMENTS 1196432  7/1965  Fed. Rep. of Germany ...... 267/141

OTHER PUBLICATIONS

Dyna-Pak Inc. Brochure, "Sucker Rod Shock Absorber–Dynamometer Test Results", Jun. 22, 1976.

*Primary Examiner*—Lawrence J. Staab
*Attorney, Agent, or Firm*—Marcus L. Bates

[57] ABSTRACT

A shock absorber apparatus connected in series relationship respective to the polished rod and bridle of a pumpjack unit. The shock absorber includes a housing within which there is supported a plurality of resilient packer members stacked in sandwiched relationship. The packer members have an axial passageway formed therethrough, with the passageway of each packer member being aligned with one another, so that the polished rod is telescopingly received therethrough. The bottom of the housing is supported by the bridle, while the polished rod is supported by a plate member which bears against the uppermost packer member. This places all of the resilient packer members in compression, with the force of the compression being proportional to the weight of the sucker rod.

6 Claims, 6 Drawing Figures

U.S. Patent  Oct. 19, 1982  4,354,397
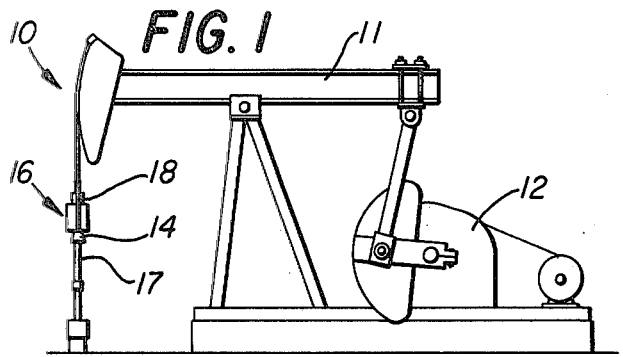
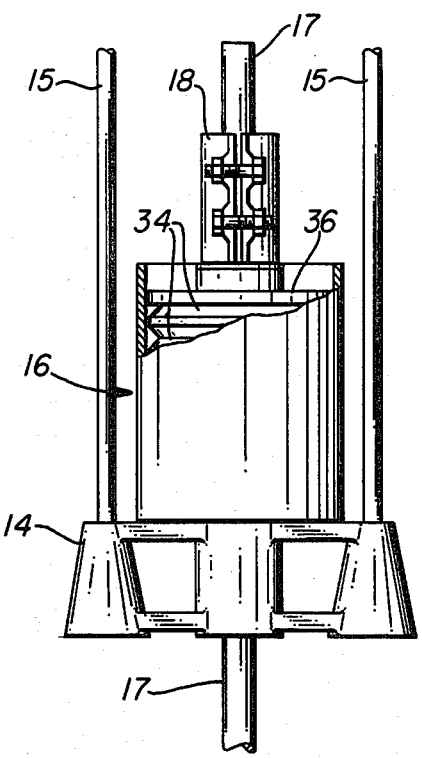
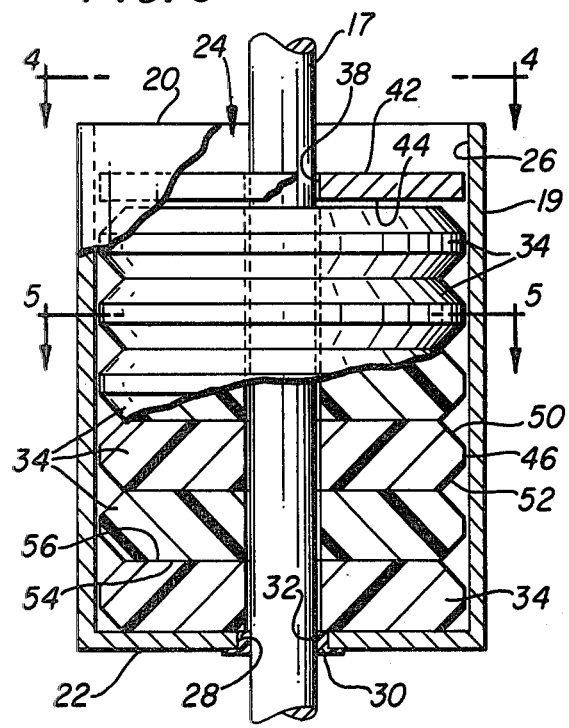
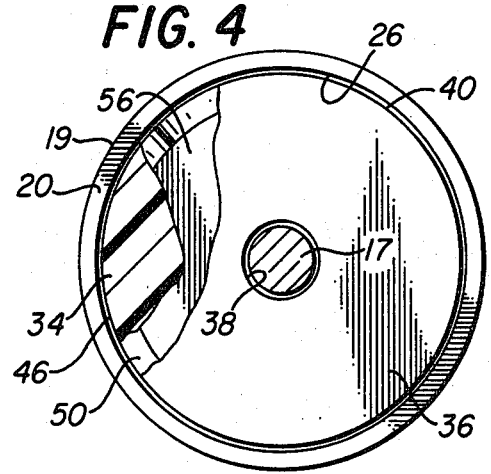
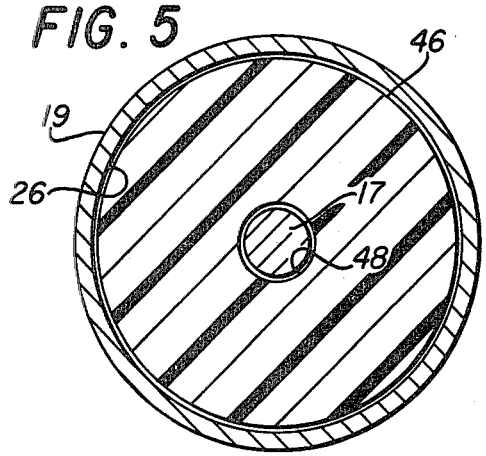
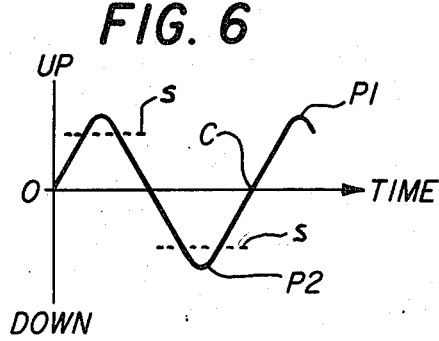

SUCKER ROD SHOCK ABSORBER

BACKGROUND OF THE INVENTION

Most oil wells require that a pumping unit of some sort be employed in order to lift hydrocarbons from the bottom of the borehole up to the surface of the ground. This pumping action is usually accomplished by employment of a pumpjack unit having a prime mover which drives a gear box, which in turn rocks a walking beam. A horsehead attached to the end of the walking beam receives a pair of cables which comprises a bridle. It is customary to directly attach a polished rod to the bridle to enable a wellhead packiny gland to sealingly engage the polished rod and seal the upper end of a production string through which the produced oil is pumped. A string of sucker rod extends from the polished rod, several thousand feet downhole to a production pump. The production pump is therefore reciprocated by the sucker rod string, which in turn is reciprocated by the polished rod of the pumpjack unit.

One of the major costs in producing an oil well is the maintenance of a pumpjack unit. Sucker rods often fail because of rod parting. This requires that an expensive pulling unit be moved onto location to remove the rod and the pump from the borehole, and replace the several throusand feet of sucker rod with new or rebuilt rod material. There are many different explanations and many proposed solutions to overcome the costly failure of sucker rods; but nevertheless, reduction of sucker rod failure appears to be one of the principal needs for the economic production of oil wells at their full capacity.

As a pumpjack unit reciprocates the downhole pump, the sucker rod string is subjected to a peak load on the up-stroke and on the down-stroke. The peak determines the size of the rod string, and therefore indirectly determines the pump size as well as the pumping speed.

It would therefore be desirable to be able to dampen or somehow reduce the peak load imparted into the rod string so as to reduce the maximum strain on the rod string. Such a desirable phenomenon would reduce the cold working stresses imposed upon the rod, enable fastener pumping speeds, and elongate the life expectancy of the expensive pumping unit as well as the downhole pump, all of which would tend to reduce the cost of producing the oil well. Such a desirable apparatus is the subject of this invention.

SUMMARY OF THE INVENTION

A shock absorber apparatus for connection in series relationship between the polished rod and bridle of a pumpjack unit reduces the strain or maximum loads imposed upon the sucker rod string, as well as reducing the load imposed upon the downhole pump.

The shock absorber apparatus includes an upwardly opening, cylindrical housing having an apertured bottom plate member affixed thereto, an apertured upper plate member slidably received within the cylindrical housing and spaced from the bottom plate member, and a plurality of concentrically arranged resilient packer members stacked within cylindrical housing in sandwiched relationship between the upper and bottom plate members.

A longitudinally extending axial passageway vertically extends through the upper and bottom plate members and through all of the packers for slidably receiving the polished rod therethrough.

Clamp means support the polish rod upon the upper plate member, and the cylindrical housing is supported on the bridle of the pumpjack unit. This arrangement of the shock absorber members compresses the upper and lower plate members toward one another, with the packer elements being compressed therebetween with a force which is equal to the tension measured within the polished rod.

This shock absorber apparatus dampens the peak load at each end of the rod stroke so that the sucker rod life is elongated, and wear on the pumpjack unit and downhole pump is sgnificantly reduced. The combination of the shock absorber apparatus with an oil well pumping enables the pump speed to be increased.

It is therefore a primary object of the present invention to provide a shock absorber means for use in conjunction with a pumpjack unit for reducing the peak loads imposed on the sucker rod string during the pumping action.

Another object of the present invention is the provision of apparatus for supporting a sucker rod string from the bridle of a pumpjack unit which acts as an absorber by which the peak loads of the rod string are dampened.

A further object of the present invention is the provision of apparatus comprising two spaced supports having resilient material therebetween, with the bottom support being supported by the pumpjack bridle, and the upper support being connected to support the weight of the rod string, so that the two support members are cyclically moved towards one another during the pumping stroke, thereby dampening the rod loads during each pumping cycle.

The present invention is attained by the provision of a resilient shock absorber apparatus which can be retrofitted to most any pumpjack unit by interposing the shock absorber apparatus between the polished rod clamp and the bridle of a pumpjack unit.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a side elevational view which sets forth a diagrammatical representation of a pumpjack unit for an oil well;

FIG. 2 is a fragmentary, enlarged, part cross-sectional view of part of the apparatus disclosed in FIG. 1;

FIG. 3 is a further enlarged, side elevational view of part of the apparatus disclosed in FIG. 2, with some parts being broken away therefrom, and some of the remaining parts being shown in cross-section;

FIG. 4 is a part cross-sectional view taken along line 4—4 of FIG. 3, with some parts being broken away therefrom;

FIG. 5 is a cross-sectional view taken along line 5—5 of FIG. 3; and,

FIG. 6 is a plot illustrating the tension or forces effected within a sucker rod string during one cycle of operation.

DETAILED DESCRIPTION OF THE PREFERRED EMBODIMENT

Throughout the various figures of the drawings, wherever it is logical or expedient to do so, like or similar numerals will refer to like or similar elements. In FIGS. 1 and 2 of the drawings, there is disclosed a pumpjack unit 10 having a walking beam 11 which is rocked by a gear box 12 driven by a suitable prime mover. A lateral support member 14 is attached to the ends of a pair of cables 15, and the cables are attached to the horsehead of the pumpjack unit. Cables 15 and member 14 are well known and comprise the bridle of the pumpjack unit.

A shock absorber apparatus 16, made in accordance with the present invention, is bottom supported on member 14. A polished rod 17 extends through member 14, through the shock absorber 16, and into engagement with clamp apparatus 18.

Members 14, 15, 17 and 18 belong to the prior art, and usually the clamp 18 engages the marginal end of the polished rod 17, with the clamp 18 being bottom supported on the top surface of member 14. Hence, it is evident that the novel shock absorber 16 of the present invention has been retrofitted to a prior art pumpjack unit.

In FIGS. 3-5, the shock absorber apparatus is seen to comprise a cylindrical housing 19 having a circumferentially extending upper terminal edge portion 20. The lower edge portion of the housing is made integral with respect to a bottom plate member 22, so that the housing is upwardly opening as indicated by the arrow at numeral 24. Numeral 26 indicates the inside circumferentially extending wall surface of the housing. The lower plate member is centrally apertured at 28. A teflon bushing 30 having a passageway 32 formed therethrough is fitted into the central aperture of the bottom plate member.

A plurality of resilient rubber packer members, hereinafter referred to as packers or packer members, are concentrically aligned with respect to one another, and stacked in sandwiched relationship on top of one another. An upper plate member 36 is provided with a central aperture 38. The upper plate member has an outside diameter 40 which enables it to be loosely received in spaced relationship respective to the inside circumferentially extending wall surface 26 of the housing, while the before mentioned aperture 38 slidably receives the polished rod therethrough. A bushing, preferably made of teflon, can be fitted at aperture 38 in a manner similar to the bushing 30, if deemed desirable. The upper plate member has an upper face 42 and a lower face 44.

Numeral 46 indicates the outside diameter of the resilient members, while numeral 48 indicates the inside diameter of the members. The inside diameter is of a size which will admit a low friction, slidable fit between the polished rod when the resilient packer member is fully compressed.

Numerals 50 and 52 indicate a truncation effected at the outer marginal edge of the packer members. The truncation provides walls which are sloped approximately 45° respective to the horizontal. The packer members each have a lower face 54 and an upper face 56, with these faces of ajdacent resilient packers abuttingly engaging another.

In FIG. 6, there is set forth a plot of rod tension versus time as measured during the typical pumpng cycle. The rod string is subjected to peak loads P1 and P2 during one pumping cycle C. The dot-dash line 5 indicates the reduction in the peak load effected by the present invention.

In order to install the shock absorber apparatus of the present invention, the pumpjack unit of FIG. 1 is shutdown, the polished rod 17 is rendered fixed respective to the upper end of the wellhead by any convenient means, and the walking beam is rocked so that the bridle descends towards the wellhead, thereby parting clamp 18 from support 14. The clamp 18 is next removed from the polished rod, the shock absorber apparatus 16 placed in the operative configuration illustrated in FIGS. 1-5 ot the drawings, and the clamp is thereafter again made up.

The clamp 18 is positioned further uphole respective to the polished rod so that the downhole pump is storked a distance which prevents the downhole pump from "bottoming out" or from being lifted excessively high respective to the pump barrel.

The size of the housing 19, the diameter and thickness of the resilient packers 34, the physical characteristics of the resilient packers, and the number of resilient packers employed within the shock absorber unit are selected in accordance with the pumping characteristics of the oil well.

In a hypothetical oil well apparatus extending 8500 feet downhole, having a rod string weight of 28,750 pounds, a rod diameter of $\frac{7}{8}$ inch, and assuming a peak load P1 and P2 being 39,000 pounds and 21,000 pounds, respectively, wherein the well was previously operated at 11 strokes per minute, the following shock absorber design was employed: 6 packer elements of $7\frac{1}{2}$ inches diameter $\times$ 2 inches thick were placed within an 8 inch inside diameter housing. The durometer reading of the topmost packer indicated that the rubber compound had a hardness of 80 shores. The 4 intermediate elements were measured at 70 shores, while the bottommost element was 80 shores.

The well could be speeded up an additional two strokes per minute, to provide 13 strokes per minute using the present invention. At 11 strokes per minute, the peak load was reduced from 39,000 pounds to 28,500. At 13 strokes per minute, the peak load returned to almost 39,000 pounds. Therefore, the apparatus compensated for the increased pumping speed.

In the above example, the addition of another resilient packer member having a durometer reading of 60 shores and sandwiched into the center of the other packer elements will reduce the peak load approximately an additional 2000 pounds.

In the above example, the elimination of one of the six resilient packer members will increase the peak load approximately 1800 pounds.

The durometer of the rubber is increased as the depth of the well is increased. Moreover, as the viscosity of the crude being produced increases, the durometer of the rubber is increased in order to achieve the most optimum well pumping characteristics.

The diameter of the individual resilient packers is increased in proportion to the rod string tension so as to achieve a bearing pressure of approximately 2500 pounds per square inch on each of the rubber packers.

In one successful shock absorber apparatus, the thickness of the individual resilient packers is slightly greater than two inches while the diameter is seven and half inches with the central aperture being two and half inches. This ratio of thickness to diameter enables an appreciable number of resilient packers to be contained within the housing, thereby enabling addition or subtraction of one or more packer members to the shock absorber in order to rapidly and economically change the pumping characteristics of the well, and enabling a minimum number of parts to be required in order to service a maximum number of different oil well configurations.

In another successful but smaller shock absorber apparatus, the packer members were five inches o.d., one and half inches id. and two inches thick.

It is possible to eliminate the sidewall 19 of the housing, thereby exposing the plurality of resilient packers to the deleterious effect of sunlight, abrasive dust laden winds, and other foreign matter. It is also possible to fit a dust cover at the upwardly, opening end 24 of the apparatus so as to eliminate foreign debris from entering the interior of the housing.

The present shock absorber, made in accordance with this invention, brings about several unexpected and unusual results. The shock absorber reducs the wear on the gear box as well as the bearings between the Samson post and the walking beam. More importantly, the apparatus significantly reduces rod breakage by dampening out or reducing the peak loads so that the string of sucker rod is subjected to lower tension forces. This results in the rod string being cold worked much less than is otherwise experienced in the prior art direct drive method. The downhole pump is subjected to less wear as the rod string reverses its direction of travel and therefore, the entire pumping unit enjoys a longer life.

In most instances, either the pump stroke or pumping frequency can be increased, thereby providing greater production while utilizing the same equipment.

I claim:

1. In a pumpjack unit having a walking beam which reciprocates a bridle, wherein the bridle is connected to a polished rod for reciprocating a downhole pump, the improvement comprising:

a shock absorber apparatus connected between the polished rod and bridle; said shock absorber including an upwardly opening cylindrical housing which terminates at the lower end thereof in an apertured bottom plate member; an apertured upper plate member received within said cylindrical housing in spaced relationship respective to said bottom plate member; and a plurality of concentrically arranged, resilient packer members stacked within said cylindrical housing in sandwiched relationship between said upper and bottom plate members; a longitudinally extending axial passageway formed through said upper and bottom plate members and through said packer members and axially receiving the polished rod therethrough;

clamp means supporting the polished rod from the upper plate member, and means by which the cylindrical housing is supported from the bridle, whereby the upper and lower plate members are biased towards one another, and compress the packer elements therebetween with a force equal to the tension in the polished rod;

the durometer of the outermost packer members is higher as compared to the durometer of the innermost packer members;

said packer members are circular with said axial passageway extending through the center thereof, the inside diameter of the packer being of a size to slidably receive the polished rod therethrough, the outside diameter of the packer being of a size to be loosely received by the interior peripheral sidewall of the cylindrical housing.

2. The improvement of claim 1 wherein said upper plate member has a flat lower surface which engages the upper face of the uppermost packer member, the upper plate member is circular and has an outside diameter which is slightly less than the inside diameter of the cylindrical housing so that the plate member can reciprocate within the housing as the packer members are compressed and relaxed during the pumping action of the pumpjack unit.

3. The improvement of claim 1 wherein the packer members are circular with said axial passageway extending through the center thereof, the inside diameter of the packer being of a value to slidably receive the polished rod therethrough, the outside diameter of the packer being of a value to be loosely received by the inner sidewall of the cylindrical housing;

said upper plate member has a flat lower surface which engages the upper face of the uppermost packer member, the upper plate member is circular and has an outside diameter slightly less than the inside diameter of the cylindrical housing, so that the plate member can reciprocate within the housing as the packer members are compressed and expanded during the pumping action of the pumpjack unit.

4. In a wellbore having a downhole pump connected to a rod string which is reciprocated by a pumpjack unit, wherein the pumpjack unit actuates a polished rod which is attached between the upper end of the rod string and to a bridle extending from the walking beam, the combination of said polished rod and bridle of a shock absorber appatatus;

said shock absorber apparatus comprising an upper and lower plate member spaced from one another by a plurality of packer members; said packer members being made of resilient rubber material and when one plate member is forced towards the other plate member, energy is stored within said packer members;

means connecting said lower plate member to the bridle of the pumpjack unit; means connecting said upper plate member to the polished rod, so that the polished rod is supported by the shock absorber apparatus which in turn is supported by the bridle, thereby forcing the resilient material to be compressed between the upper and lower plate members with a force equal to the polished rod load:

said packer members each have opposed parallel faces which are placed in abutting relationship respective to one another with the packer members being sandwiched between the upper and lower plate members: the durometer of the outermost packer members is greater than the durometer of the innermost packer members;

an axial passageway extending along a common axial centerline formed through said upper and lower plate members and through said packer members: and, said polished rod is received through said axial passageway:

said packer members are circular, with said aperture extending through the center thereof, the inside diameter of the packer members being of a value to slidably receive the polished rod therethrough; the outside diameter of the packer members being of a value to be loosely received by the interior sidewall of said cylindrical housing.

5. The combination of claim 4 wherein said upper plate member has a flat lower surface which engages the upper face of the uppermost packer member, the upper plate member is circular and has an outside diameter slightly less than the inside diameter of the cylindrical housing, so that the plate member can reciprocate within the housing as the packer members are compressed and expanded during the cyclic pumping action of the pumpjack unit.

6. The combination of the claim 5 wherein said upper plate member has a float lower surface which engages the upper face of the uppermost packer member, the upper plate member is circular and has an outside diameter which is slightly less than the inside diameter of the cylindrical housing, so that the plate member can reciprocate within the housing as the packer members are compressed and expanded during the pumping action of the pumpjack unit;

each packer member is made of rubber, and includes opposed flat faces with the distance therebetween being of a value to enable a plurality of packers to be contained within the cylindrical housing so that the number and design of the packers can be selected according to the history of the wellbore being produced by the pumpjack unit.

* * * * *

UNITED STATES PATENT AND TRADEMARK OFFICE
CERTIFICATE OF CORRECTION

PATENT NO. : 4,354,397
DATED : October 19, 1982
INVENTOR(S) : PAUL W. FIX

It is certified that error appears in the above—identified patent and that said Letters Patent is hereby corrected as shown below:

Column 1, line 15, correct the spelling of "packing";
Line 36, insert --load-- after "peak";
Column 3, line 68, correct the spelling of "pumping";
Column 4, line 18, substitute --stroked-- for "storked";
Column 5, line 47, delete "and" after "member"
Column 7, line 12, delete "the" before "claim"; and
Line 13, substitute --flat-- for "float".

Signed and Sealed this

First Day of March 1983

[SEAL]

Attest:

GERALD J. MOSSINGHOFF

Attesting Officer      Commissioner of Patents and Trademarks